United States Patent
Burkhardt et al.

(10) Patent No.: US 6,823,508 B1
(45) Date of Patent: Nov. 23, 2004

(54) AUTOMATIC COMPUTER PROGRAM CUSTOMIZATION BASED ON A USER INFORMATION STORE

(75) Inventors: Ryan Burkhardt, Redmond, WA (US); Tom G. Yaryan, Seattle, WA (US); Seetharaman Harikrishnnan, Redmond, WA (US); Donald J. McNamara, Woodinville, WA (US); David J. D'Souza, Mercer Island, WA (US); Nicholas R. Legget, Seattle, WA (US); David Scott Johnson, Seattle, WA (US); Seung-Yup Chai, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/560,676

(22) Filed: Apr. 27, 2000

(51) Int. Cl.[7] .............................................. G06F 9/445
(52) U.S. Cl. ...................... 717/174; 709/200; 713/1; 713/2; 713/100; 717/175; 718/100
(58) Field of Search ........................... 713/1, 100, 2; 709/200, 100; 717/175, 174, 105

(56) References Cited

U.S. PATENT DOCUMENTS

| | | | | |
|---|---|---|---|---|
| 5,325,532 A | * | 6/1994 | Crosswy et al. | 713/2 |
| 5,481,714 A | * | 1/1996 | Pipkin et al. | 717/175 |
| 5,822,565 A | * | 10/1998 | DeRosa et al. | 703/24 |
| 6,002,868 A | * | 12/1999 | Jenkins et al. | 717/105 |
| 6,182,275 B1 | * | 1/2001 | Beelitz et al. | 717/175 |
| 6,247,128 B1 | * | 6/2001 | Fisher et al. | 713/100 |
| 6,262,726 B1 | * | 7/2001 | Stedman et al. | 345/745 |
| 6,279,154 B1 | * | 8/2001 | Davis | 717/174 |
| 6,298,443 B1 | * | 10/2001 | Colligan et al. | 713/200 |
| 6,357,000 B1 | * | 3/2002 | Jain | 713/1 |
| 6,385,766 B1 | * | 5/2002 | Doran et al. | 717/174 |
| 6,389,591 B1 | * | 5/2002 | Andrew | 717/169 |
| 6,449,642 B2 | * | 9/2002 | Bourke-Dunphy et al. | 709/222 |
| 6,490,678 B1 | * | 12/2002 | Aquilar et al. | 713/2 |
| 6,535,976 B1 | * | 3/2003 | Hoggarth et al. | 713/2 |
| 6,543,004 B1 | * | 4/2003 | Cagle et al. | 714/15 |

FOREIGN PATENT DOCUMENTS

EP 474578 A1 * 3/1992 ............ G06F/9/445

* cited by examiner

Primary Examiner—Meng-Al T. An
Assistant Examiner—Lilian Vo
(74) Attorney, Agent, or Firm—Lee & Hayes, PLLC

(57) ABSTRACT

Software programs, such as an operating system or other application programs, are automatically customized to a specific user(s) based on data corresponding to the specific user(s) that is maintained in a user information store. In one embodiment, the information store is a unified store that is accessible by multiple programs including the operating system. Thus, new information or information changes can be made available to multiple programs by the user adding (or changing) the information only once. In another embodiment, the operating system image to be installed on a computer is pre-populated with user-specific information at the factory. The user-specific information can be integrated into the operating system at the factory or alternatively upon an initial boot of the computer by the user.

26 Claims, 6 Drawing Sheets

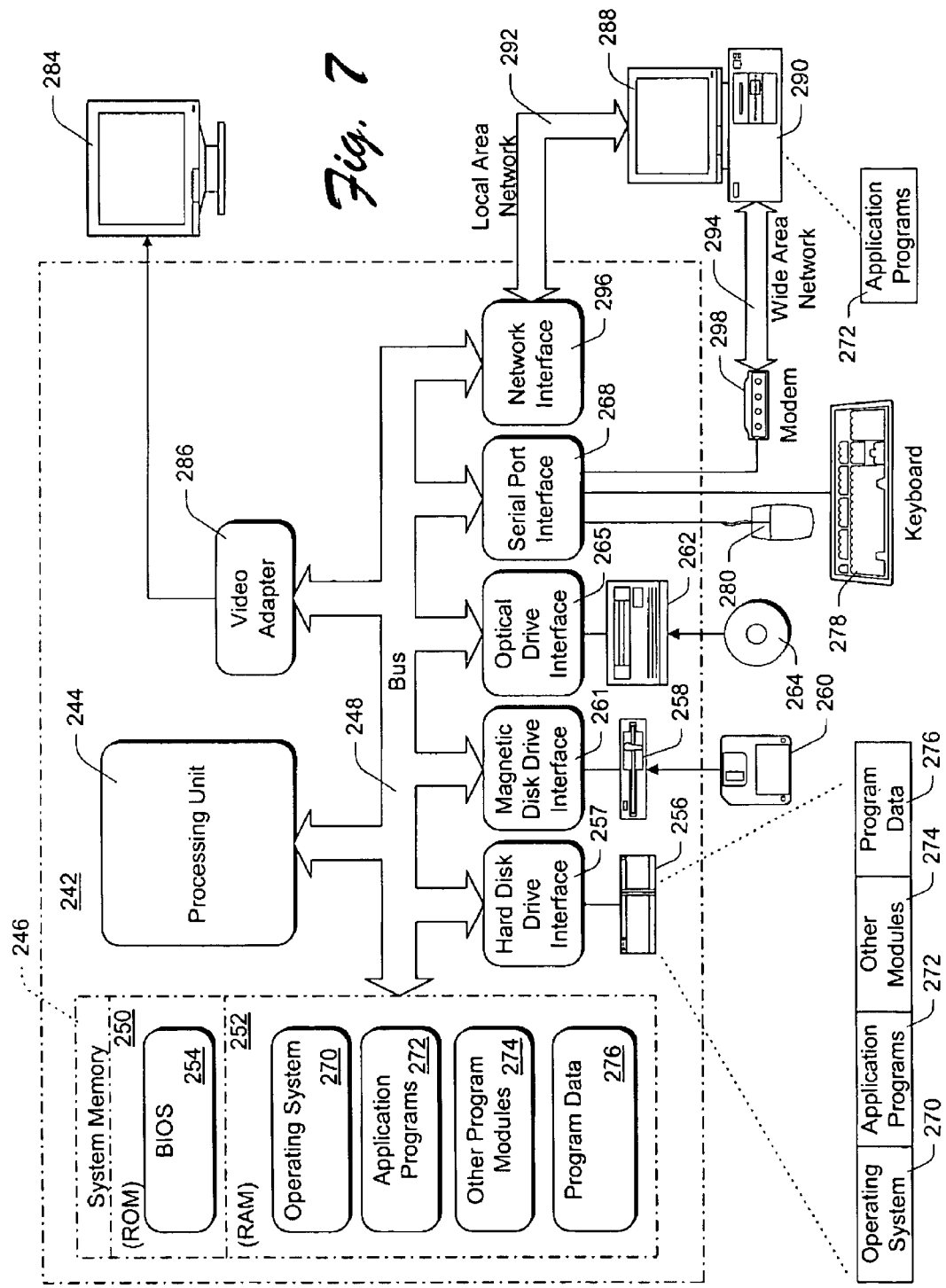

AUTOMATIC COMPUTER PROGRAM CUSTOMIZATION BASED ON A USER INFORMATION STORE

TECHNICAL FIELD

This invention relates to installing programs on computers, and more particularly to automatically customizing a program based on a user information store.

BACKGROUND OF THE INVENTION

Conventional computers generally execute one or more software programs, such as operating systems, productivity applications, educational applications, recreational applications, etc. Before such a software program can be executed by the computer, it typically must be installed on the computer, a process which usually involves copying one or more files from a distribution medium (e.g., a CD ROM) onto a storage device (e.g., a hard disk) of the computer, as well as possibly informing the operating system of the newly installed program.

A current trend in computer development and design is towards an increase in user-friendliness. Making software, and thus the computers that run the software, easier to use increases the number of people that will actually use the computers and software. Furthermore, by improving the user-friendliness of a computer or the installed software the overall user experience in using that computer or software can correspondingly be improved.

One way in which user-friendliness is improved, for both software and the computer as a whole, is allowing for user-customization of the software. For example, the user's name, street address, electronic mail address, display preferences, etc. can be provided to the software. This allows the software to address the user at a personal level (e.g., by name) and operate in a manner that is more to the user's liking.

Unfortunately, such user-customization typically must be performed manually by the user and typically must be repeated for multiple software programs. For example, the user must add his or her name to each of multiple programs, add his or her street address to each of multiple programs, add his or her email address to each of multiple programs, etc. This manual information entry, especially when repeated numerous times, becomes burdensome on the user and thus reduces the user-friendliness of the computer.

Furthermore, requiring manual entry of such user information reduces the "out of box" experience for the user. The "out of box" experience refers to the user's experience the first time he or she uses his or her new computer (i.e., when he or she takes the new computer out of its box, plugs it in, and turns it on). One solution to improve the "out of box" experience would be to have the user information immediately available to the user for this first use of the computer, such as by having a manufacturer add the user information for the user. Unfortunately, such manufacturer-entry of the user information is an expensive process and can be cost-prohibitive. Thus, it would be beneficial to improve the "out of box" experience for the user in a different manner.

The automatic program customization based on a user information store described below addresses these and other disadvantages.

SUMMARY OF TIDE INVENTION

Automatic program customization based on a user information store is described herein. Programs, such as an operating system or other application programs, are automatically customized to a specific user(s) based on data corresponding to the specific user(s) that is maintained in a user information store.

According to one aspect, the information store is a unified store that is accessible by multiple application programs as well as the operating system. Thus, new information or information changes can be made available to multiple applications by the user adding (or changing) the information only once.

According to another aspect, the operating system image to be installed on a computer is pre-populated with user-specific information at the factory. The user-specific information can be integrated into the operating system at the factory or alternatively upon an initial boot of the computer by the user. By pre-populating the operating system image to be installed on the computer with the user-specific information, the computer is customized to the user the first time he or she uses the computer.

According to another aspect, the user information store is used to determine what functionality the operating system is to include. By way of example, certain functionality may only be installed on the computer if the user has a particular profession, hobby, or interest identified in the user information store. By way of another example, a special tutorial may be included and automatically run when the computer is turned on if the user is a novice computer user.

BRIEF DESCRIPTION OF THE DRAWINGS

The present invention is illustrated by way of example and not limitation in the figures of the accompanying drawings. The same numbers are used throughout the figures to reference like components and/or features.

FIG. 7 shows a general example of a computer that can be used in accordance with certain embodiments of the invention.

DETAILED DESCRIPTION

In the discussion below, embodiments of the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that various embodiments of the invention may be practiced with other computer system configurations, including hand-held devices, gaming consoles, multiprocessor systems, microprocessor-based or programmable consumer electronics, network PCs, minicomputers, mainframe computers, and the like. In a distributed computer environment, program modules may be located in both local and remote memory storage devices.

Alternatively, embodiments of the invention can be implemented in hardware or a combination of hardware, software, and/or firmware. For example, at least part of the invention could be implemented in one or more application specific integrated circuits (ASICs), one or more programmable logic devices (PLDs), etc.

Figure 1:
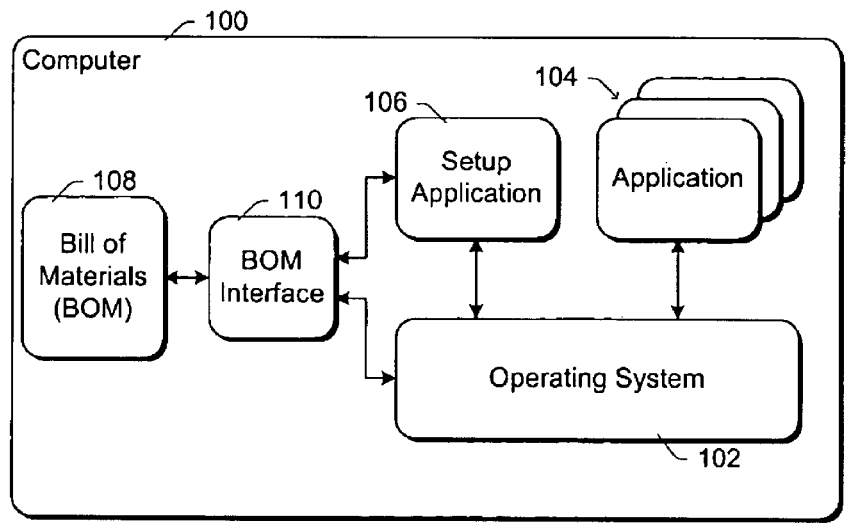
FIG. 1 is a block diagram illustrating an exemplary computer system in accordance with certain embodiments of the invention.

FIG. 1 is a block diagram illustrating an exemplary computer system in accordance with certain embodiments of the invention. A computer system 100 is illustrated including an operating system 102, one or more application programs 104, a setup application program 106, a bill of materials (BOM) 108, and a BOM interface 110.

Operating system 102 is the fundamental software control program for computer 100, performing various functions including providing a user interface, managing the execution of one or more applications 104–106, and controlling the input of data from and output of data to various input/output (I/O) devices. Operating system 102 can be any of a wide variety of conventional operating systems, such as any of the "WINDOWS" operating systems available from Microsoft Corporation of Redmond, Wash.

Application programs 104 represent one or more of a wide variety of software application programs that can be executed on computer 100. Examples of such application programs include educational programs, reference programs, productivity programs (e.g., word processors, spreadsheets, databases), recreational programs, utility programs (e.g., communications programs), etc. Application programs 104 may be installed on computer 100 by the user, or alternatively pre-installed by the manufacturer or distributor of computer 100.

BOM 108 is a compilation of customization information for one or more users (or prospective users) of computer 100. In one implementation, any data describing the identity of a user or hardware preferences of a user that the operating system or an application program allows to be customized can be included in the user information of BOM 108. BOM 108 is used to customize software programs (including operating system 102 and/or application programs 104) to the particular user(s) of computer 100. As multiple different programs can obtain information from BOM 108, BOM 108 is referred to as a "unified" information store. BOM 108 is stored in a known location on computer 100 or a remote location accessible by computer 100, such as with a known name in a particular directory (e.g., the root directory) of a primary hard disk of computer 100, a known name at a particular remote server, etc.

Operating system 102 can optionally be a "componentized" operating system. In a componentized operating system, the operating system functionality is separated into multiple different components, each component including one or more files. Each component has a corresponding manifest that identifies which other components, if any, that particular component is dependent on. Additionally, an operating system bill of materials (OS BOM) is also included that identifies which components are installed on (or to be installed on) a computer as the operating system. This identification can be direct (e.g., the component names or identifiers are listed) or indirect (e.g., one or more components are identified because of their inclusion in a manifest corresponding to another identified component). In a componentized operating system, BOM 108 can be included as one of the components installed on a computer (e.g., referred to as an identity component). Alternatively, BOM 108 can identify which components are installed on (or are to be installed on) the computer.

Regardless of whether operating system 102 is a componentized operating system, BOM interface 110 provides an interface between BOM 108 and setup application 106 as well as operating system 102 (and optionally one or more of application programs 104). BOM interface 110 allows operating system 102 and/or application programs 104 to retrieve data from BOM 108, modify data in BOM 108, and/or add data to BOM 108. In one implementation, BOM interface 110 is implemented as an Application Programming Interface (API). Alternatively, operating system 102, application programs 104, or setup application 106 may access BOM 108 directly rather than via interface 110.

Setup application program 106 is an application program that integrates the information from BOM 108 into operating system 102. Setup application 106 executes during installation of operating system 102, or alternatively at other times, such as the first time computer 100 is turned on (i.e., booted) by the user. Setup application 106 retrieves various information for one or more users of computer 100 from BOM 108 and customizes operating system 102 based on the retrieved information. Although illustrated as a separate application, setup application 106 may alternatively be part of operating system 102 or another application program. In some implementations, setup application program 106 continues to operate as an integration manager after installation of operating system 102, managing subsequent updating of operating system 102.

Setup application 106 can integrate information from BOM 108 into operating system 102 in a variety of different manners. Information from BOM 108 can be used to directly alter a setting in operating system 102. For example, the user's name stored in BOM 108 may be input to operating system 102 so that operating system 102 can address the user by name. By way of another example, the user's preferred desktop theme stored in BOM 108 may be input to operating system 102 to change the current desktop theme setting of operating system 102.

Information from BOM 108 can also be used to determine what functionality is included in operating system 102. By way of example, certain functionality of the operating system may be specifically installed (or not installed) based on the user-specific information, such as installing particular files or components providing enhanced graphics features if the user-information indicates the user is a graphic artist or an educator, etc. By way of another example, if BOM 108 indicates that a user is not very familiar with computers, then particular files or components that target beginning or novice users can be added to the operating system and the operating system modified to execute such applications when booted.

BOM 108 can optionally include user information for multiple users. Many current operating systems support multiple users, allowing different user names (or "logon" names) to be created for each of the users. Each user is then able to have his or her own settings, such as desktop theme, name and address, etc. When handling multiple users, setup application 106 requests operating system 102 to create multiple user names, one for each user identified in BOM 108. Setup application 106 then provides the user information corresponding to each user to operating system 102 in order to customize the operating system 102 settings for that particular user using the information in BOM 108.

In the illustrated example, BOM 108 is added to computer 100 by the manufacturer or distributor of computer 100. Alternatively, situations can arise where the manufacturer or distributor does not add BOM 108 to computer 100 (e.g., computer 100 is purchased from a local retailer who has little or no knowledge of who the purchaser is). In such situations BOM 108 is added to computer 100, after the consumer acquires the computer, in any of a wide variety of manners. For example, upon initial boot setup application 106 may copy (e.g., via a network interface card or modem) BOM 108 from a remote location to computer 100.

Figure 2:
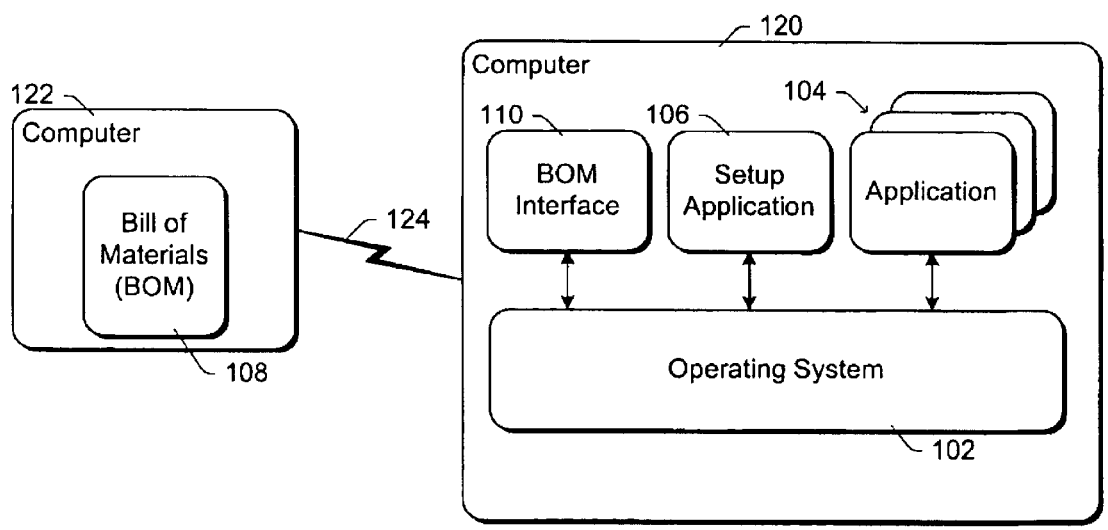
FIG. 2 is a block diagram illustrating another exemplary computer system in accordance with certain embodiments of the invention.

FIG. 2 is a block diagram illustrating another exemplary computer system in accordance with certain embodiments of the invention. The system of FIG. 2 includes two computers 120 and 122 coupled via a communication link 124. Communication link 124 represents any of a wide variety of communications channels, including digital and analog channels as well as wired or wireless channels. By way of example, communication link 124 may be a local area network (LAN), wide area network (WAN), a public network (e.g., the Internet), a combination of two or more of these, etc.

Computer 120 is similar to computer 100 of FIG. 1, and includes operating system 102, one or more application programs 104, setup application program 106, and BOM interface 110. Client computer 120, however, does not include a BOM. Rather, BOM 108 is included on computer 122. Thus, BOM 108 is accessed via communications link 124.

Depending on the nature of communications link 124 and the information in BOM 108, default information may be used by setup application 106 and then changed when BOM 108 is retrieved from computer 122. For example, communications link 124 may be the Internet and BOM 108 may include the user-specific information for computer 120 to access the Internet. In this situation, setup application 106 includes default Internet connection information (e.g., a toll-free access number for an Internet Service Provider managed by the manufacturer of computer 120) to be able to make a connection to computer 122 and retrieve BOM 108. Upon receipt of BOM 108, the default information used by setup application 106 is overwritten as necessary as part of the integration process.

Computer 122 can be a server computer that is accessible to multiple different users via communication link 124, and may optionally maintain multiple different BOMs 108 for different users. Alternatively, computer 122 may maintain a BOM 108 that is accessible by only a single user via communication link 124. BOM 108 can be accessible to a user regardless of what computer the user is using. By way of example, computer 122 may include an operating system and BOM interface (analogous to computer 100) and operate as a desktop computer. Computer 120, on the other hand, may be a portable computer that accesses the single BOM 108 maintained by the desktop computer. Thus, only a single BOM 108 is maintained for the user, and is shared by multiple applications executing on the user's desktop computer and portable computer.

Figure 3:
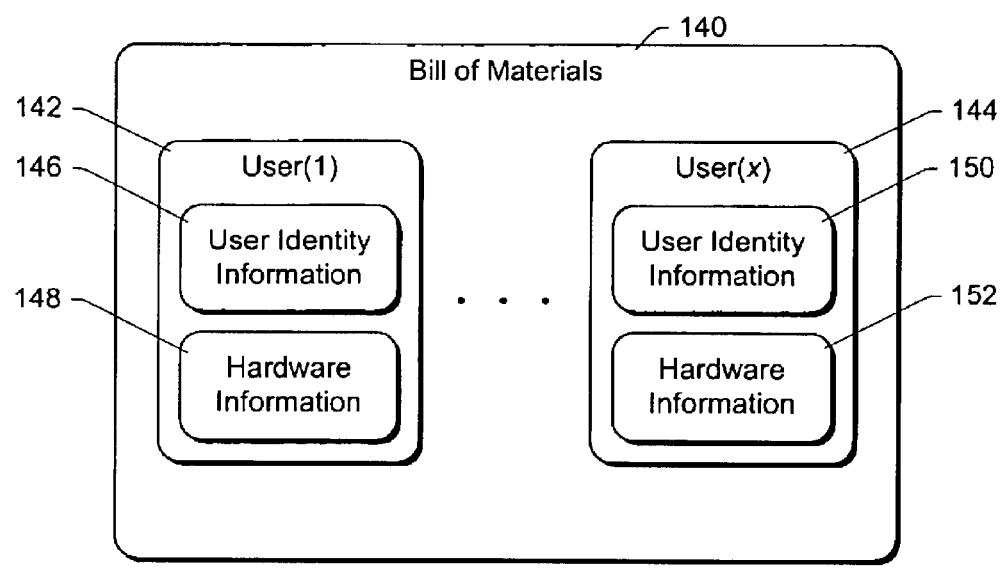
FIG. 3 illustrates an exemplary bill of materials in accordance with certain embodiments of the invention.

FIG. 3 illustrates an exemplary bill of materials in accordance with certain embodiments of the invention. BOM of materials 140 of FIG. 3 can be, for example, BOM 108 of FIGS. 1 or 2.

BOM 140 includes customization information for one or possibly multiple (x) users 142 and 144. BOM 140 includes user information 142 for one user and user information 144 for another user. User information 142 includes user identity information 146 and hardware information 148, while user information 144 includes user identity information 150 and hardware information 152. User identity information 146 and 150 each include data describing the identity of the corresponding users. Any of a wide variety of information describing a user can be maintained as user identity information 146 and 150, such as name, initials, home address, business address, state of residence, country of citizenship, electronic mail (email) address, age, social security number, date of birth, organization name, profession, hobbies, interests, computer expertise, telephone number, etc.

Hardware information 148 and 152 include data describing hardware preferences of the corresponding users. Any of a wide variety of information describing hardware preferences can be maintained as hardware information 148 and 152, such as color preferences, speaker volume preferences, desktop background preferences, desktop theme preferences, display preferences (e.g., resolution and number of colors), language preferences, Internet service provider (ISP) identifier and access information (e.g., telephone number and logon identification), whether telephone features (e.g., call-waiting) should be disabled, preferred default printer, time zone setting, whether particular end user license agreements (EULAs) have been accepted by the user, computer name, what specific hardware to install on the computer at boot time, etc.

BOM 140 is available to any program and thus operates as a unified information store. Any changes made by one program to BOM 140 are available to all other programs, thereby alleviating the user of having to enter the same changes into multiple programs.

Additionally, the user information 142 and 144 can optionally include program-specific information. Information specific to a particular program can be written to BOM 140 by that particular program, or alternatively by another program (e.g., operating system 102). A program can store any user-customizable settings in BOM 140, allowing the settings to be automatically customized for another computer accessing BOM 140.

It should be noted that not every BOM (nor the user information for different users within the same BOM) need include the same information. The information included in a BOM for a particular user can vary based on the operating system and/or application programs being used by the user, the amount of information that the user is willing to divulge and have stored in the BOM, etc.

Figure 4:
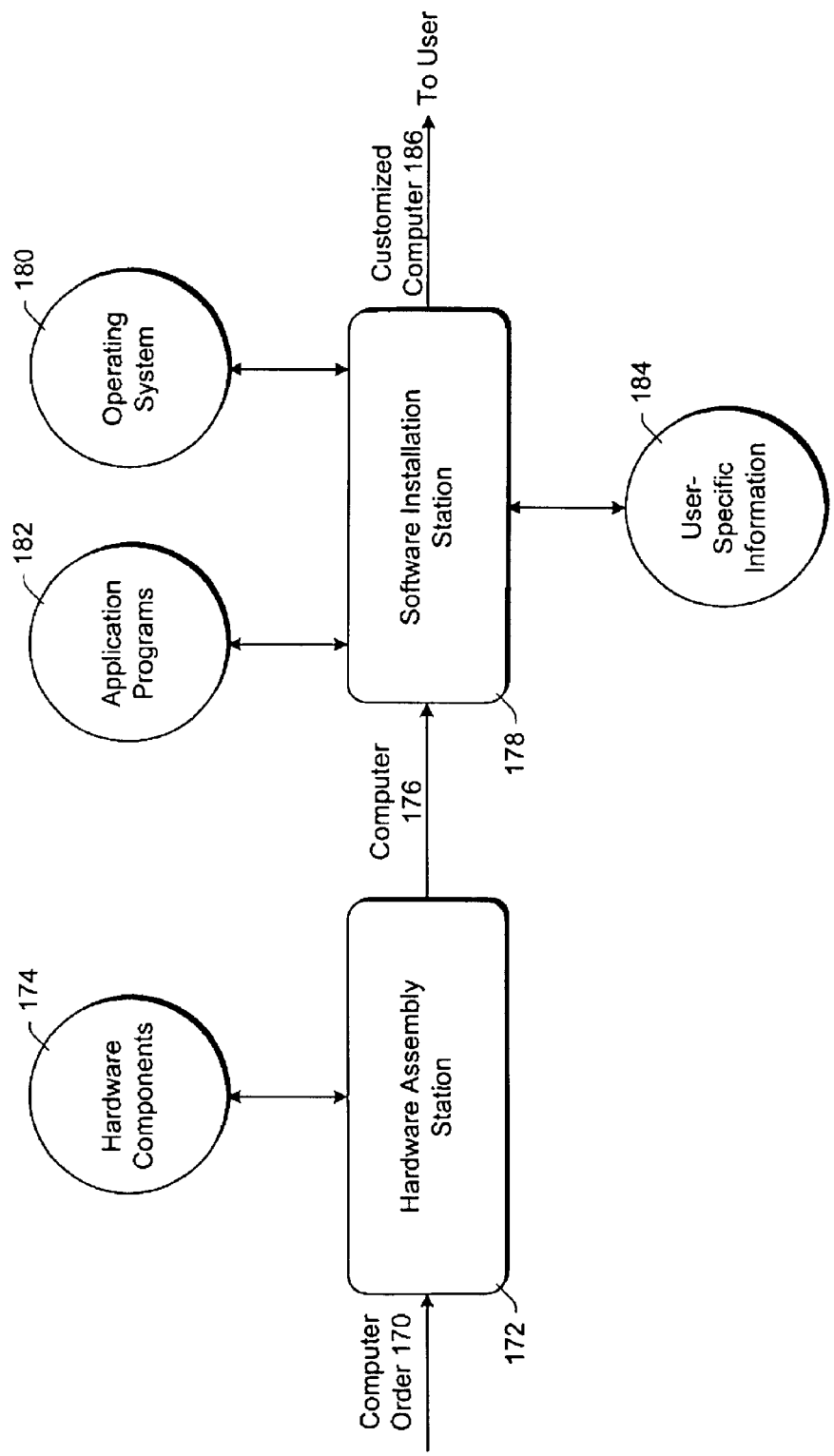
FIG. 4 illustrates an exemplary customized computer manufacturing process in accordance with certain embodiments of the invention.

FIG. 4 illustrates an exemplary customized computer manufacturing process in accordance with certain embodiments of the invention. Initially, an order 170 for a computer is received from a consumer, which may or may not be a prospective user of the computer. For example, a child may order a computer for his/her parent without any intention of using the computer himself/herself.

The computer order 170 is routed to a hardware assembly station 172 at which point multiple hardware components 174 are assembled to build the computer 176. The assembly of hardware components may be automated, performed manually, or a combination thereof. The assembled computer is then submitted to a software installation station 178. At software installation station 178, the operating system 180 and various application programs 182 are copied to computer 176. This copying of software programs (application programs 182 and operating system 180) may be done individually or alternatively as a combined process (e.g., pre-generated software images including operating system 180 and various combinations of application programs 182 may be used to copy multiple programs to computer 176 concurrently).

User-specific information 184 is also added to computer 176 as a BOM, resulting in an operating system image on the computer that is pre-populated with the user-specific information. This user-specific information 184 can be integrated into operating system 180 (or other applications) at software installation station 178, or alternatively such integration may occur at the first boot of the computer by the user. The customized computer 186, with user-specific information 184 installed on it, is then provided to the user.

The order of manufacturing illustrated in FIG. 4 is exemplary only, and various alternative orders can be implemented. By way of example, operating system 180 and user-specific information 184 may be installed on or copied to a hard disk drive prior to adding the drive to the computer at hardware assembly station 172.

Figure 5:
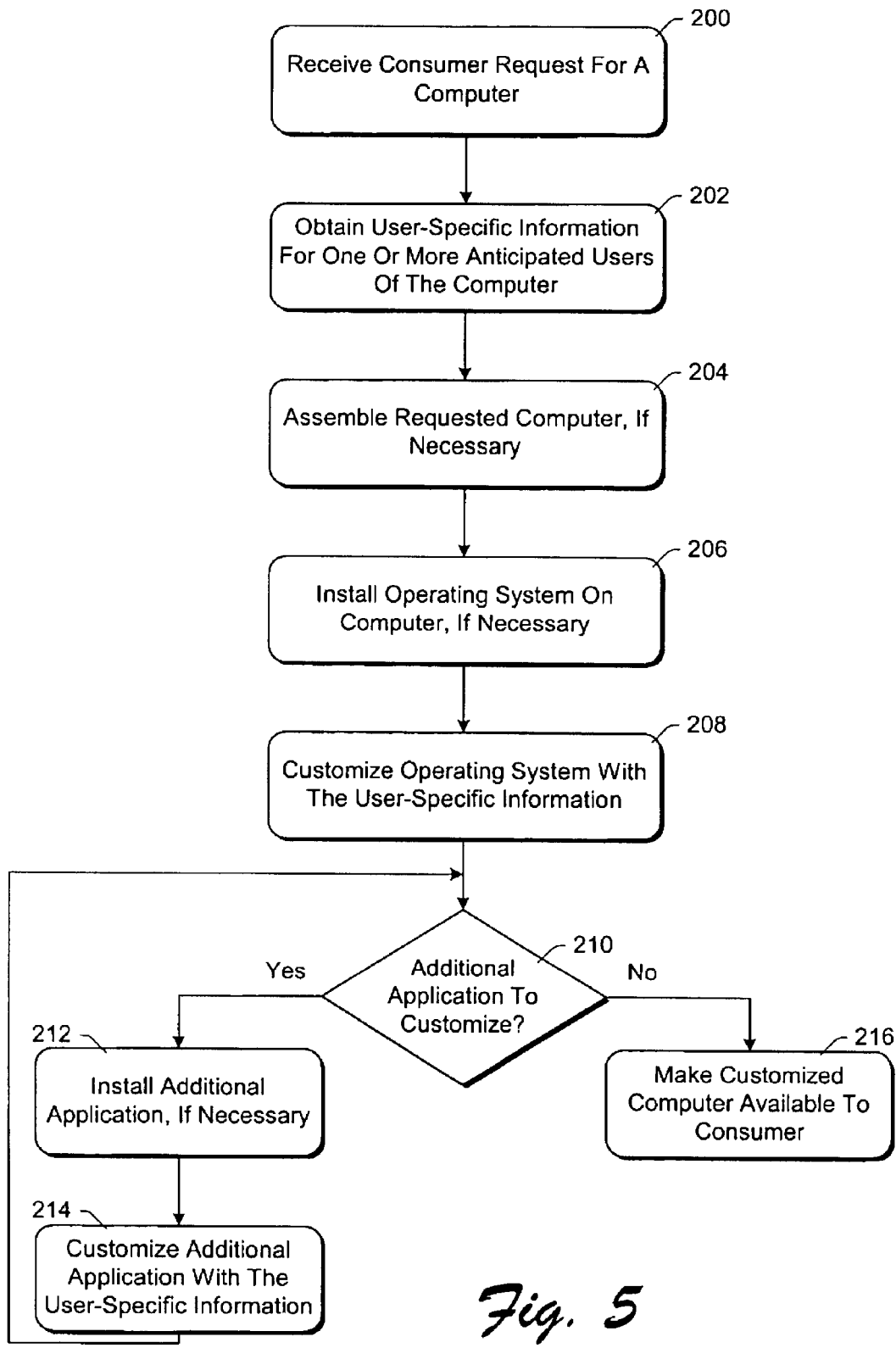
FIG. 5 illustrates an exemplary process for manufacturing a computer with a customized software program based on user-specific information in accordance with certain embodiments of the invention.

FIG. 5 illustrates an exemplary process for manufacturing a computer with a customized software program based on user-specific information in accordance with certain embodiments of the invention. The process of FIG. 5 is implemented at stations 172 and 178 of FIG. 4, and may be performed in software, hardware, firmware, or a combination thereof. FIG. 5 is described with additional reference to components in FIG. 1.

Initially, a consumer request for a computer is received, act 200. This consumer request can be submitted by the user and received in any of a wide variety of manners, such as via the Internet, facsimile, letter, email, telephone call, etc.

Once received, user-specific information for one or more anticipated or prospective users of the computer is obtained, act 202. The user-specific information can be obtained in any of a wide variety of manners. In one implementation, the consumer is queried for the user-specific information at the time the request is submitted by the user. For example, if the consumer orders the computer over World Wide Web on the Internet, then Web pages with additional questions may be presented to the consumer and the answers to these questions used as the user-specific information. By way of another example, if the consumer orders the computer by email, then a reply email message with additional questions may be sent to the consumer. When the consumer responds to the reply email message, the answers in the response are used as the user-specific information.

Alternatively, the information may be obtained from the computer from which the request is submitted. For example, if a consumer orders a new computer over the Internet using his or her current computer, the BOM on his or her current computer can be copied (or retrieved via a BOM interface) and used as the user-specific information for the new computer.

The requested computer is then assembled (if necessary), act 204. In some situations the computer hardware may be pre-assembled, thereby alleviating the need to assemble the computer in act 204. The operating system is also installed on the computer (if necessary), act 206. In some situations the operating system may be pre-installed (e.g., copied to a hard disk drive), thereby alleviating the need to install the operating system on the computer in act 206.

The operating system is then customized with the user-specific information, act 208. The user-specific information is integrated into the operating system, such as by setup application 106 as discussed above. Alternatively, rather than having the user-specific information integrated at the time of installation, the user-specific information could be integrated at first boot.

Alternatively, the installation and customization acts 206 and 208 can occur concurrently, with the user-specific information being used to affect the installation of the operating system. By way of example, certain functionality of the operating system may be specifically installed (or not installed) based on the user-specific information, such as installing particular files or components if the user-information indicates the user is an author, a graphic artist, an educator, etc.

Once the operating system is installed, a check is made as to whether an additional application program is to be customized, act 210. If an additional application program is to be customized, then the application program is installed (if necessary), act 212, and customized with the user-specific information, act 214. The process then returns to check whether an additional application program is to be customized, act 210. When there are no more application programs to be customized, the customized computer is made available to the consumer, act 216. Alternatively, some application programs may access the BOM and customize themselves based on the information in the BOM.

Figure 6:
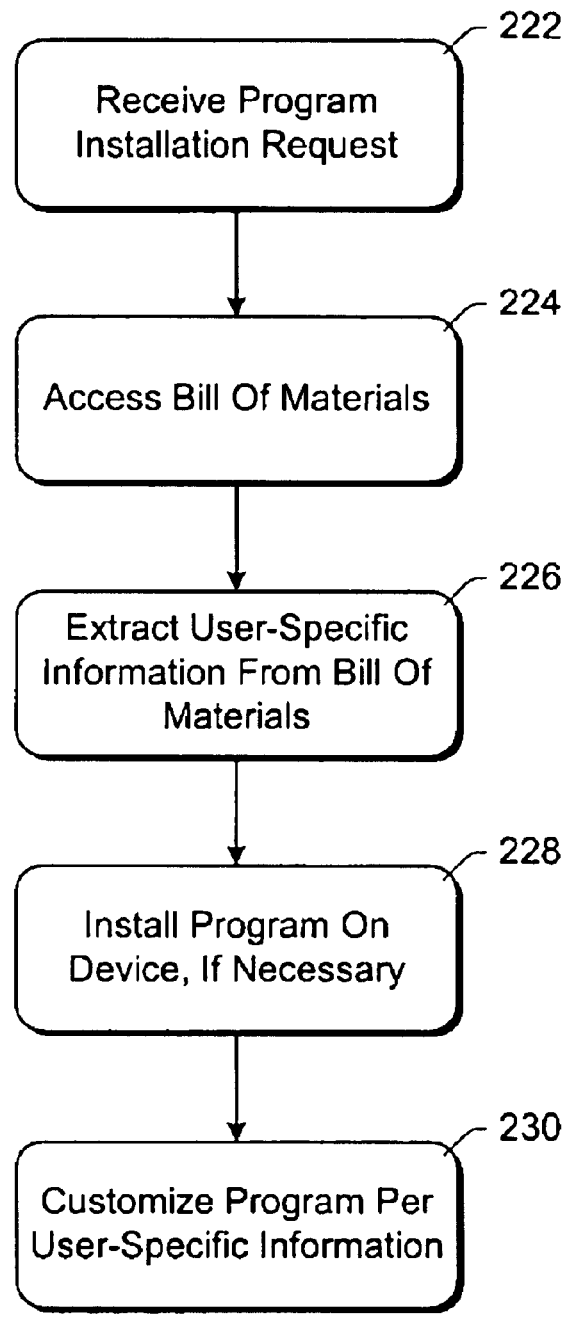
FIG. 6 illustrates an exemplary process for customizing a program based on user-specific information in accordance with certain embodiments of the invention.

FIG. 6 illustrates an exemplary process for customizing a program based on user-specific information in accordance with certain embodiments of the invention. The process of FIG. 6 is implemented by a computer, such as computer 100 of FIG. 1 or computer 120 of FIG. 2, and may be performed in software, hardware, firmware, or a combination thereof. FIG. 6 is described with additional reference to components in FIGS. 1 and 2.

Initially, a request to install a program is received, act 222. The program can be any of a wide variety of conventional application programs, or alternatively or an operating system. The request may be an explicit request (e.g., the user double-clicking on a "setup" or "install" icon, or typing in a setup or install command, etc.) or implicit (e.g., putting a CD ROM with an uninstalled program into the CD ROM drive of the computer, turning on the computer the first time, etc).

Once the request is received the BOM is accessed, act 224. As discussed above, the BOM can be stored and accessed locally or remotely. User-specific information is extracted from the BOM, act 226, and the program is installed on the device, act 228. Once installed, the program is customized per the users specific information, act 230. Alternatively, the installation and customization acts 228 and 230 may occur concurrently, with the user-specific information being used to affect the installation of the application (e.g., what functionality or files are to be included).

FIG. 7 shows a general example of a computer 242 that can be used in accordance with certain embodiments of the invention. Computer 242 is shown as an example of a computer that can perform the functions of a computer 100 of FIG. 1, a computer 120 of FIG. 2, or a computer 122 of FIG. 2. Computer 242 includes one or more processors or processing units 244, a system memory 246, and a bus 248 that couples various system components including the system memory 246 to processors 244.

The bus 248 represents one or more of any of several types of bus structures, including a memory bus or memory controller, a peripheral bus, an accelerated graphics port, and a processor or local bus using any of a variety of bus architectures. The system memory includes read only memory (ROM) 250 and random access memory (RAM) 252. A basic input/output system (BIOS) 254, containing the basic routines that help to transfer information between elements within computer 242, such as during start-up, is stored in ROM 250. Computer 242 further includes a hard disk drive 256 for reading from and writing to a hard disk, not shown, connected to bus 248 via a hard disk driver interface 257 (e.g., a SCSI, ATA, or other type of interface); a magnetic disk drive 258 for reading from and writing to a removable magnetic disk 260, connected to bus 248 via a magnetic disk drive interface 261; and an optical disk drive 262 for reading from or writing to a removable optical disk 264 such as a CD ROM, DVD, or other optical media, connected to bus 248 via an optical drive interface 265. The drives and their associated computer-readable media provide nonvolatile storage of computer readable instructions, data structures, program modules and other data to for computer 242. Although the exemplary environment described herein employs a hard disk, a removable magnetic disk 260 and a removable optical disk 264, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 260, optical disk 264, ROM 250, or RAM 252, including an operating system 270, one or more application programs 272, other program modules 274, and program data 276. Operating system 270 can be any of a variety of operating systems, such as any of the "Windows" family of operating systems available from Microsoft Corporation of Redmond, Wash. A user may enter commands and information into computer 242 through input devices such as keyboard 278 and pointing device 280. Other input devices (not shown) may include a microphone, joystick, game pad, satellite dish, scanner, or the like. These and other input devices are connected to the processing unit 244 through an interface 268 (e.g., a serial port interface) that is coupled to the system bus. A monitor 284 or other type of display device is also connected to the system bus 248 via an interface, such as a video adapter 286. In addition to the monitor, personal computers typically include other peripheral output devices (not shown) such as speakers and printers.

Computer 242 can operate in a networked environment using logical connections to one or more remote computers, such as a remote computer 288. The remote computer 288 may be another personal computer, a server, a router, a network PC, a peer device or other common network node, and typically includes many or all of the elements described above relative to computer 242, although only a memory storage device 290 has been illustrated in FIG. 2. The logical connections depicted in FIG. 2 include a local area network (LAN) 292 and a wide area network (WAN) 294. Such networking environments are commonplace in offices, enterprise-wide computer networks, intranets, and the Internet. In the described embodiment of the invention, remote computer 288 executes an Internet Web browser program such as the "Internet Explorer" Web browser manufactured and distributed by Microsoft Corporation of Redmond, Wash.

When used in a LAN networking environment, computer 242 is connected to the local network 292 through a network interface or adapter 296. When used in a WAN networking environment, computer 242 typically includes a modem 298 or other means for establishing communications over the wide area network 294, such as the Internet. The modem 298, which may be internal or external, is connected to the system bus 248 via a serial port interface 268. In a networked environment, program modules depicted relative to the personal computer 242, or portions thereof, may be stored in the remote memory storage device. It will be appreciated that the network connections shown are exemplary and other means of establishing a communications link between the computers may be used.

Generally, the data processors of computer 242 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described herein in conjunction with a microprocessor or other data, processor. The invention also includes the computer itself when programmed according to the methods and techniques described herein. Furthermore, certain sub-components of the computer may be programmed to perform the functions and acts described herein. The invention includes such sub-components when they are programmed as described. In addition, the invention described herein includes data structures as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

The above description references installation of software programs, including application programs and operating systems. It is to be appreciated, however, that the invention similarly applies to installation of other types of programs, such as firmware programs.

CONCLUSION

Thus, automatic program customization based on a user information store has been described. The same information store can be used by multiple different programs, including an operating system, advantageously creating a unified storage location for user-specific information. Additionally, the user-specific information can be advantageously used to automatically customize programs, including an operating system, thereby alleviating a user or manufacturer of the burden of manually entering such data and at the same time creating a personalized, customized, "out of box" experience for the purchaser of a new computer.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:
1. A method comprising:
   receiving information about a prospective user of an operating system;

developing an operating system image, pre-populated with the information, to be installed on a first computer, wherein the receiving comprises obtaining the information from a second computer used by a consumer to order the first computer with the operating system; and wherein the obtaining comprises accessing a bill of materials corresponding to the second computer.

2. A method as recited in claim 1, wherein the information comprises data describing the identity of the prospective user.

3. A method as recited in claim 1, wherein the information comprises one or more of the user's name, initials, street address, state of residence, country of citizenship, electronic mail (email) address, age, social security number, date of birth, profession, hobbies, interests, and computer.

4. A method as recited in claim 1, wherein the information comprises data describing hardware preferences of the prospective user.

5. A method as recited in claim 1, wherein the consumer is the prospective user.

6. A method as recited in claim 1, further comprising storing the information in a second bill of materials corresponding to the first computer.

7. A method as recited in claim 6, further comprising making the second bill of materials available to other application programs.

8. A method as recited in claim 1, wherein the receiving further comprises receiving information about a plurality of prospective users of the operating system, and wherein the developing comprises developing the operating system image, pre-populated with the information for each of the plurality of prospective users, to be installed on the first computer.

9. A method as recited in claim 1, wherein the operating system is organized as a plurality of components, and wherein one of the plurality of components is an identity component that includes the information.

10. One or more computer-readable media having stored thereon a computer program that, when executed by one or more processors of a computer, causes the one or more processors to:

obtain, from a fist computer used by a consumer to order a second computer with an operating system, information about a prospective user of the operating system by accessing a bill of materials corresponding to the first computer; and develop an operating system image, pre-populated with the information, to be installed on the second computer.

11. One or more computer-readable media as recited in claim 10, wherein the information comprises data describing the identity of the prospective user.

12. One or more computer-readable media as recited in claim 10, wherein the information comprises one or more of the user's name, initials, street address, state of residence, country of citizenship, electronic mail (email) address, age, social security number, date of birth, profession, hobbies, interests, and computer expertise.

13. One or more computer-readable media as recited in claim 10, wherein the information comprises data describing hardware preferences of the prospective user.

14. One or more computer-readable media as recited in claim 10, wherein the consumer is the prospective user.

15. One or more computer-readable media as recited in claim 10, wherein the computer program further causes the one or more processors to store the information in a second bill of materials corresponding to the second computer.

16. One or more computer-readable media as recited in claim 15, further comprising malting the second bill of materials available to other application programs.

17. One or more computer-readable media as recited in claim 10, wherein to obtain information about the prospective user is further to obtain information about a plurality of prospective users of the operating system, and wherein to develop the operating system image is further to develop the operating system image, pre-populated with the information for each of the plurality of prospective users, to be installed on the second computer.

18. One or more computer-readable media as recited in claim 10, wherein the operating system is organized as a plurality of components, and wherein one of the plurality of components is an identity component that includes the information.

19. A system comprising:

means for obtaining, from a first computer used by a consumer to order a second computer with an operating system, information about a prospective user of the operating system by accessing a bill of materials corresponding to the first computer; and means for developing an operating system image, pre-populated with the information, to be installed on the second computer.

20. A system as recited in claim 19, wherein the information comprises data describing the identity of the prospective user.

21. A system as recited in claim 19, wherein the information comprises one or more of the users name, initials, street address, state of residence, country of citizenship, electronic mail (email) address, age, social security number, date of birth, profession, hobbies, interests, and computer expertise.

22. A system as recited in claim 19, wherein the information comprises data describing hardware preferences of the prospective user.

23. A system as recited in claim 19, wherein the consumer is the prospective user.

24. A system as recited in claim 19, further comprising means for storing the information in a second bill of materials corresponding to the second computer.

25. A system as recited in clam 19, wherein the means for obtaining further comprises means for obtaining information about a plurality of prospective users of the operating system, and wherein the means for developing further comprises means for developing the operating system image, pre-populated with the information for each of the plurality of prospective users, to be installed on the second computer.

26. A system as recited in claim 19, wherein the operating system is organized as a plurality of components, and wherein one of the plurality of components is an identity component that includes the information.

* * * * *